(12) United States Patent
Parker

(10) Patent No.: US 7,343,363 B1
(45) Date of Patent: Mar. 11, 2008

(54) METHODS AND APPARATUS FOR GROUPING ELEMENTS OF ELEMENT PAIRS INTO ELEMENT SETS

(75) Inventor: Charles A. Parker, Exton, PA (US)

(73) Assignee: Unisys Corporation, Blue Bell, PA (US)

( * ) Notice: Subject to any disclaimer, the term of this patent is extended or adjusted under 35 U.S.C. 154(b) by 449 days.

(21) Appl. No.: 10/952,632

(22) Filed: Sep. 29, 2004

(51) Int. Cl.
*G06F 17/00* (2006.01)
*G06N 5/00* (2006.01)
*G06N 5/02* (2006.01)

(52) U.S. Cl. ...................................... 706/45
(58) Field of Classification Search ............. 706/45–46
See application file for complete search history.

(56) References Cited

U.S. PATENT DOCUMENTS

| | | | | |
|---|---|---|---|---|
| 4,009,347 | A * | 2/1977 | Flemming et al. | 370/321 |
| 5,148,432 | A * | 9/1992 | Gordon et al. | 714/7 |
| 5,548,192 | A * | 8/1996 | Hanks | 318/560 |
| 5,592,599 | A * | 1/1997 | Lindholm | 345/427 |
| 5,742,295 | A * | 4/1998 | Lindholm | 345/427 |
| 6,121,533 | A * | 9/2000 | Kay | 84/616 |
| 6,275,817 | B1 | 8/2001 | Reed et al. | |
| 7,069,577 | B2 * | 6/2006 | Geile et al. | 725/106 |
| 7,116,374 | B2 * | 10/2006 | Chupp et al. | 348/473 |

OTHER PUBLICATIONS

Active phased array design for high reliability Agrawal, A.K.; Holzman, E.L.; Aerospace and Electronic Systems, IEEE Transactions on vol. 35, Issue 4, Oct. 1999 pp. 1204-1211 Digital Object Identifier 10.1109/7.805438.*

An Ontology Based Knowledge Clustering Method in Knowledge Space Gou, Jin; Wu, Yangyang; Luo, Wei; Anti-counterfeiting, Security, Identification, 2007 IEEE International Workshop on Apr. 16-18, 2007 pp. 406-409 Digital Object Identifier 10.1109/IWASID.2007.373666.*

Optimization Techniques for Two-Dimensional Placement Markov, L.A.; Fox, J.R.; Blank, J.H.; Design Automation, 1984. 21st Conference on Jun. 25-27, 1984 pp. 652-654.*

Optimization and synthesis for complex reactive embedded systems by incremental collapsing Chiodo, M.; Hardware/Software Codesign, 2002. CODES 2002. Proceedings of the Tenth International Symposium on May 6-8, 2002 pp. 115-120 Digital Object Identifier 10.1109/CODES.2002.1003611.*

* cited by examiner

*Primary Examiner*—Michael B. Holmes
(74) *Attorney, Agent, or Firm*—Richard J. Gregson; Robert P. Marley; RatnerPrestia

(57) ABSTRACT

Methods and apparatus for grouping elements of element pairs into element sets are disclosed. A master processor transmits number pairs corresponding to the element pairs to worker processors, selectively assigns processing of one or more of the number pairs to the worker processors, receives developed sets of numbers from the worker processors, and processes the developed sets of numbers to generate the element sets. Worker processors process the assigned number pairs using a row hash table and a column hash table created from the number pairs corresponding to the element pairs to develop the sets of numbers.

25 Claims, 4 Drawing Sheets

US 7,343,363 B1

METHODS AND APPARATUS FOR GROUPING ELEMENTS OF ELEMENT PAIRS INTO ELEMENT SETS

FIELD OF THE INVENTION

The present invention relates to the field of computer science and, more particularly, the methods and apparatus for grouping elements of element pairs into element sets for use in computer processing systems such as artificial intelligence systems.

BACKGROUND OF THE INVENTION

Artificial intelligence systems frequently group like elements of element pairs to establish relationships among elements. By establishing relationships among elements, these systems are able to improve system performance. For example, in semiotic decision-making systems, element pairs such as pairs of letters or words are processed to create sets of letters or words to improve performance characteristics such as processing speed and accuracy. An exemplary semiotic decision-making system in which letter element pairs are grouped into sets of letters is described in U.S. Pat. No. 6,275,817 to Reed et al. entitled SEMIOTIC DECISION MAKING SYSTEM USED FOR RESPONDING TO NATURAL LANGUAGE QUERIES AND OTHER PURPOSES AND COMPONENTS THEREFOR, which issued as a patent on Aug. 14, 2001.

There is an ever-present desire for artificial intelligence systems having higher speed and accuracy. Although improvements in accuracy are achievable by grouping like elements of element pairs, the grouping process is computationally intensive, which can adversely affect speed. Accordingly, improved methods and apparatus are needed for efficiently grouping like elements of element pairs that are not subject to this limitation. The present invention addresses this need among others.

SUMMARY OF THE INVENTION

The present invention is embodied in methods and apparatus for grouping elements of element pairs into element sets. A master processor transmits number pairs corresponding to the element pairs to worker processors, selectively assigns processing of one or more of the number pairs to the worker processors, receives developed sets of numbers from the worker processors, and processes the developed sets of numbers to generate the element sets. Worker processors process the assigned number pairs using a row hash table and a column hash table created from the number pairs corresponding to the element pairs to develop the sets of numbers.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Included in the drawings are the following figures.

DETAILED DESCRIPTION OF THE INVENTION

Figure 1:
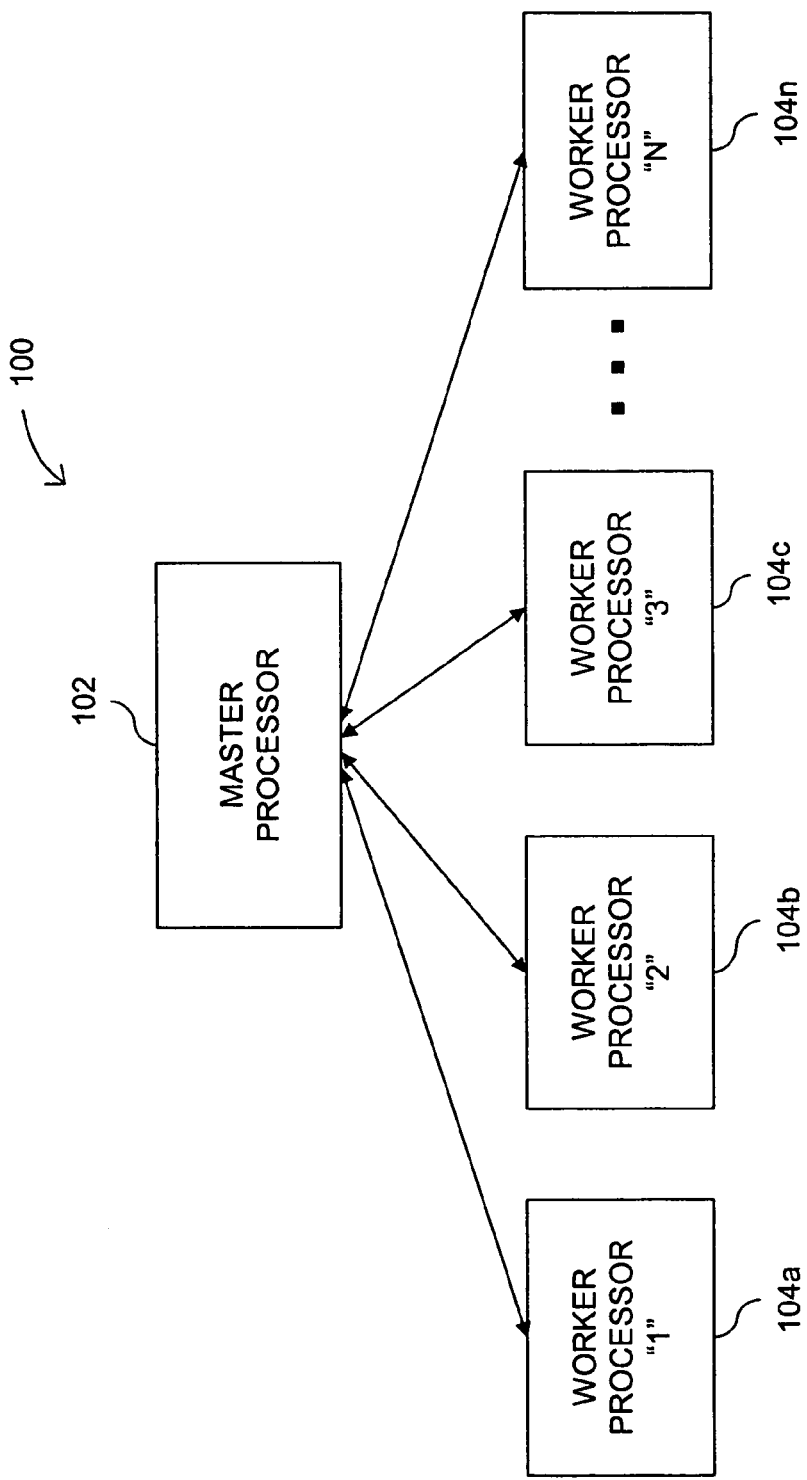
FIG. 1 is a block diagram of an exemplary processing system in accordance with the present invention.

FIG. 1 is a conceptual representation of an exemplary processing system 100 for grouping elements of element pairs into element sets in accordance with one aspect of the preset invention. It will be understood by one of skill in the art that embodiments of the present invention may be implemented in hardware, software, or a combination thereof. In such embodiments, the various component and steps described below may be implemented in hardware and/or software.

A master processor 102 receives and processes pairs of elements for distributed processing by worker processors (represented by worker processors "1-N" 104a-n) in communication with the master processor 102. In an exemplary embodiment, the master processor 102 and the worker processors 104 are configured to perform instructions and to communicate over a network such as global information network (e.g., the Internet) or an intranet. Connections may be established via a Transmission Control Protocol/Internet Protocol (TCP/IP) socket connection using either an Internet Domain Name (IDN) or an IP address. Suitable processing systems for use as the master processor 102 and as the worker processors 104 will be understood by one of skill in the art from the description herein.

In an exemplary embodiment, the master processor 102 stores information about the worker processors 104, e.g., identification and location information, in a memory (not shown) associated with the master processor 102. The number of worker processors 104 within the system may be static or may dynamically change as one or more work processors become available or unavailable.

The master processor 102 and the worker processors 104 may operate in a symmetric multiprocessing environment. In a symmetric multiprocessing environment, the master processor 102 may invoke individual threads for communication with each worker processor 104 so that the master processor 102 can selectively assign number pairs to the multiple worker processors for concurrent processing in accordance with the present invention.

The pairs of element in a set may be, by way of non-limiting example, letters, words, sentences, numbers, or essentially any elements that share a "quality," e.g., common letters, words, phrases, sentences, or numbers. U.S. Pat. No. 6,275,817 to Reed et al. describes pairs of letter and word elements that are grouped in a semiotic decision-making system. For descriptive purposes, the present invention will be described with reference to an element pair list of word pairs, which is depicted in TABLE 1.

TABLE 1

| Element # | Color | Color |
|---|---|---|
| 1 | Red | Crimson |
| 2 | Red | Scarlet |
| 3 | Scarlet | Crimson |
| 4 | Red | Blue |
| 5 | Red | Yellow |
| 6 | Yellow | Blue |
| 7 | Red | Green |
| 8 | Blue | Green |
| 9 | Yellow | Golden |
| 10 | Golden | Silver |
| 11 | Golden | Bronze |
| 12 | Silver | Bronze |
| 13 | Golden | Flaxen |
| 14 | Golden | Blonde |
| 15 | Flaxen | Blonde |
| 16 | Violet | Purple |
| 17 | Black | Ebony |

Within TABLE 1, the first column depicts an element number, the second column depicts a first element of each element pair, and the third column depicts a second element of each element pair. Each element in the element pair list is a color. One or more of the element pairs share a "quality" that is common to those element pairs. For example, the first element pair and the second element pair each share the quality "red."

Figure 2:
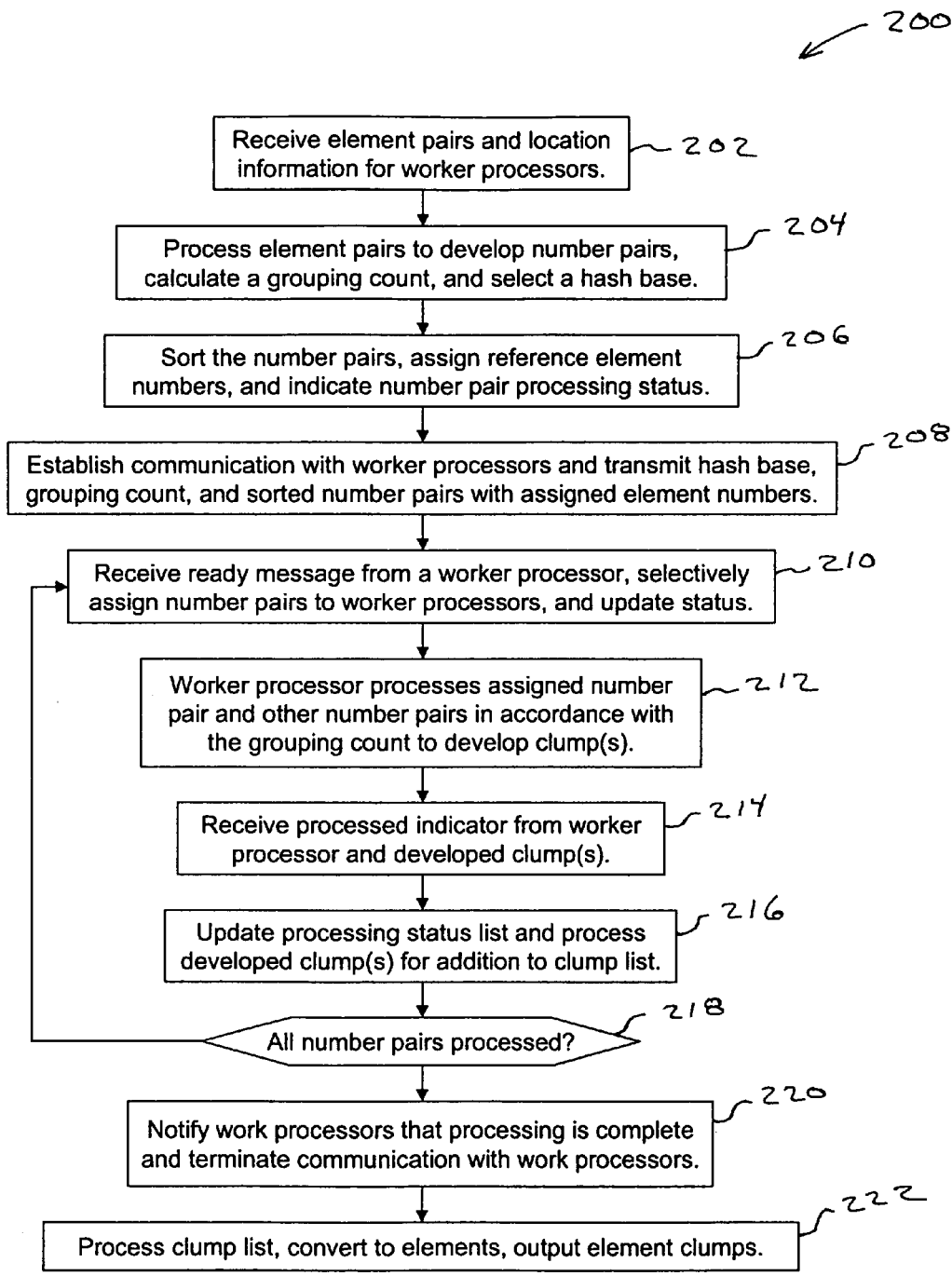
FIG. 2 is a flow chart of exemplary processing steps performed by an exemplary master processor in accordance with the present invention.

FIG. 2 depicts a flow chart 200 of exemplary steps performed by a master processor in accordance with the present invention. The exemplary steps are described with reference to FIG. 1. At block 202, the master processor 102 receives element pairs and location information for each of the worker processors 104. The location information may include an IDN or an IP address associated with each of the worker processors 104. The master processor 102 may receive the location information from a memory associated with the master processor 102, for example. For descriptive purposes, the element pairs may be the element pairs in TABLE 1. Although seventeen element pairs are illustrated in TABLE 1, essentially any number of element pairs may be received at the master processor 102 for processing. In addition, although the elements in TABLE 1 are colors, the present invention may be used with essentially any type of element.

At block 204, the master processor 102 processes the element pairs within the element pair list (e.g., TABLE 1) to develop a number pair list, calculate a grouping count, and select a hash base. In an exemplary embodiment, the master processor develops a number pair list by sequentially (or non-sequentially) assigning numbers to each unique element within the element pair list. For example, the colors within the element pair list of TABLE 1 may be assigned numbers as follows: red=1, crimson=2, scarlet=3, blue=4, yellow=5, green=6, golden=7, silver=8, bronze=9, flaxen=10, blonde=11, violet=12, purple=13, black=14, ebony=15. For descriptive purposes, a number pair list corresponding to the element pair list of TABLE 1 is depicted in TABLE 2.

TABLE 2

| Element # | Row | Column |
|---|---|---|
| 1 | 1 | 2 |
| 2 | 1 | 3 |
| 3 | 2 | 3 |
| 4 | 1 | 4 |
| 5 | 1 | 5 |
| 6 | 4 | 5 |
| 7 | 1 | 6 |
| 8 | 4 | 6 |
| 9 | 5 | 7 |
| 10 | 7 | 8 |
| 11 | 7 | 9 |
| 12 | 8 | 9 |
| 13 | 7 | 10 |
| 14 | 7 | 11 |
| 15 | 10 | 11 |
| 16 | 12 | 13 |
| 17 | 14 | 15 |

Within TABLE 2, the first column depicts the element number, the second column depicts a first number of each number pair, and the third column depicts a second number of each number pair. In embodiments where the elements of the element pairs are numbers, the elements may remain unchanged and, thus, conversion is unnecessary. Alternatively, the numbers may be converted to other numbers to facilitate processing.

The master processor 102 may calculate a grouping count by taking the absolute value of the result achieved by dividing the number of element pairs by the number of worker processors. For descriptive purposes, the number of worker processors is three and, thus, the grouping count is 5 (i.e., |17 element pairs/3 work processors|=5). In an exemplary embodiment, if the grouping count is zero, the grouping count is set to one. The master processor 102 may know the number of work processors 104 based on information stored in a memory associated with the master processor 102, for example. Alternatively, the master processor 102 may send an availability query to a plurality of potential worker processors 104 and the number of those worker processors 104 that respond affirmatively to the availability query may be used as the number of worker processors 104.

The master processor 102 selects a hash base for developing a row hash table and a column hash table at the worker processors 104, the importance of which will become clear below. In an exemplary embodiment, the master processor 102 selects a prime number for the hash base having the same order of magnitude as the quantity of number pairs in the element and/or number pair lists and that will not overburden the worker processors. For descriptive purposes, a hash base of eleven is used for the seventeen elements pairs in the number pair list. The selection of a suitable hash base will be understood by one of skill in the art from the description herein.

At block 206, the master processor 102 sorts the number pair list, assigns reference element numbers, and indicates number pair processing status. In addition, the master processor may indicate the next row and/or column to process. A sorted number pair list for descriptive purposed is depicted in TABLE 3.

TABLE 3

| Reference Element # | Row | Column | Status | Row Next | Column Next |
|---|---|---|---|---|---|
| 1 | 1 | 2 | UNPROCESSED | 2 | 16 |
| 2 | 1 | 3 | UNPROCESSED | 3 | 6 |
| 3 | 1 | 4 | UNPROCESSED | 4 | 17 |

TABLE 3-continued

| Reference Element # | Row | Column | Status | Row Next | Column Next |
|---|---|---|---|---|---|
| 4 | 1 | 5 | UNPROCESSED | 5 | 7 |
| 5 | 1 | 6 | UNPROCESSED | 16 | 8 |
| 6 | 2 | 3 | UNPROCESSED | 0 | 0 |
| 7 | 4 | 5 | UNPROCESSED | 8 | 0 |
| 8 | 4 | 6 | UNPROCESSED | 0 | 0 |
| 9 | 5 | 7 | UNPROCESSED | 0 | 0 |
| 10 | 7 | 8 | UNPROCESSED | 11 | 0 |
| 11 | 7 | 9 | UNPROCESSED | 12 | 14 |
| 12 | 7 | 10 | UNPROCESSED | 13 | 0 |
| 13 | 7 | 11 | UNPROCESSED | 0 | 15 |
| 14 | 8 | 9 | UNPROCESSED | 0 | 0 |
| 15 | 10 | 11 | UNPROCESSED | 0 | 0 |
| 16 | 12 | 13 | UNPROCESSED | 0 | 0 |
| 17 | 14 | 15 | UNPROCESSED | 0 | 0 |

Within TABLE 3, the first column depicts an assigned reference element number, the second column depicts a first number of the sorted number pairs (i.e., the row), the third column depicts the second number of the sorted number pairs (i.e., the column), and the fourth column depicts the status of the number pairs. The fifth column depicts a next number pair to process based on a "hashed" row number, which is an optional calculation. The row numbers are hashed using modulo division and then processed in numerical order, e.g., all hashed row zero value followed by all hash row one values followed by all hash row two values etc. For example, there are no hashed row zero values; a hashed row for reference elements 1-5, is one (i.e., 1 MOD 11=1); and a hashed row for reference element number 16 is one (i.e., 12 MOD 11=1). Thus, after the number pairs with a row equal to one, the number pairs with a row equal to eleven are processed as indicated by the 16 in the "row next" column of reference element 5, i.e., the last number pair with a row equal to one. If a zero is encountered in the row next column, processing proceeds to the next hashed row value. The sixth column depicts a next number pair to process based on a "hashed" column number, which is also an optional calculation.

In an exemplary embodiment, the master processor 102 sorts the number pairs, e.g., by the first number of the pair and then by the second number of pairs with common first numbers. Reference element numbers may be sequentially assigned to the sorted number pairs.

In an exemplary embodiment, the status of each number pair may be either unprocessed (UNPROCESSED), in progress (IN_PROGRESS) or processed (PROCESSED). A number pair is unprocessed before the master processor 102 assigns processing of that number pair to a work processor 104, a number pair is in progress when that number pair has been assigned to one or more work processors 104 for processing, and a number pair is processed after a work processor 104 processing that number pair indicates to the master processor 102 that it has finished processing that number pair.

At block 208, the master processor 102 establishes communication with the worker processors 104 and transmits the hash base, grouping count, and sorted number pairs with assigned reference element numbers to the worker processors 104. In an exemplary embodiment, communication is established via a TCP/IP socket connection using either an IDN or an IP address of the worker processors 104. Messages may be exchanged to indicating availability in a manner that will be understood by one of skill in the art.

Once communication is established, the master processor 104 may transmit the hash base, grouping count, and sorted number pairs to the worker processors 104.

At block 210, the master processor 102 receives ready to process messages from one or more of the worker processors 104, selectively assigns number pairs to the worker processors 104 for processing in accordance with the present invention, and updates the status of the number pairs. In an exemplary embodiment, the master processor 102 receives a ready to process message from one or more of the worker processors 104 and sequentially assigns one or more number pairs to each of the one or more worker processors 104 in the order that the ready to process messages were received.

In an exemplary embodiment, the master processor 102 updates the status of the assigned number pair and, optionally, additional number pairs that are part of a processing group (e.g., defined by the grouping count) to in progress (IN_PROGRESS). In an exemplary embodiment, the additional number pairs include the next "grouping count" number of elements minus one. For example, if the grouping count is five, the status of the next four number pairs is updated to in progress along with the assigned number pair. The additional number pairs may be assigned sequentially by reference element number, sequentially by the next processing row and/or column, or by essentially any method that ensures processing of each number pair.

In embodiments where all number pairs are either in progress (IN_PROGRESS) or processed (i.e., there are no number pairs having an unprocessed status (UNPROCESSED), the master processor 102 may assign number pairs that are in progress to another worker processor 104 that indicates it is ready for processing. Thus, multiple worker processors 104 may work on the same number pair so that if a worker processor 104 fails when working on a number pair, that number pair is eventually assigned to another work processor 104. Worker processors 104 may be reassigned if they complete processing of their initially assigned number pair and optional additional number pairs.

At block 212, the worker processors 104 process the assigned number pair and, optionally, the additional number pairs in the processing group to develop corresponding sets of numbers. In embodiments where the grouping count is one (or is not used), a worker processor 104 processes the number pair associated with the element number sent by the master processor 102 in the step of block 210. In embodiments where the grouping count is greater than one, the worker processor 104 processes the number pair associated with the element number sent by the master processor 102 and the additional number pairs in the processing group. Additional details regarding processing of number pairs by the worker processor 104 to develop corresponding sets of numbers are described below with reference to FIG. 3.

At block 214, the master processor 102 receives a processed indicator from the worker processors and, if developed, a proposed set of numbers (clump) developed by the worker processors 104. In an exemplary embodiment, the master processor 102 receives a processed indicator and, if developed, a set of numbers associated with a number pair from a worker processor after the worker processor processes each number pair. For example, if the grouping count is five, the master processor may receive five processed indicators (i.e., one for each number pair in the processing group). In an alternative exemplary embodiment, the worker processor may send an indicator and developed sets of numbers when it has finished processing all number pairs in a processing group.

At block 216, the master processor 102 updates the processing status and processes the developed clumps for addition to a clump list (i.e., a set of developed clumps). In an exemplary embodiment, the master processor 102 updates the processing status of each number pair in response to receipt, from a worker processor 104, of a processed indicator associated with that number pair. In an alternative exemplary embodiment, the master processor 102 updates the status of each number pair in a processing group when a processing indicator associated with a first number in the processing group in received.

In an exemplary embodiment, the master processor 102 compares the developed clumps to all clumps existing in the clump list. If the developed clump is a subset or the same as an existing clump, it is discarded. If the developed clump is a superset of one or more clumps, those one or more clumps are replaced with the developed clump. If the developed clump is not equal to, is a super set of, or is a subset of an existing clump, the developed clump is added to the clump list.

At block 218, a decision is made regarding the number of pairs processed. If all number pairs have not been processed, processing proceeds at block 210 with the steps of blocks 210-216 being repeated until all element pairs are processed. Otherwise, processing proceeds at block 220, where the master processor 102 sends a message to the worker processors 104 notifying them that processing is complete and closes the communication channels with the worker processors 104.

At block 222, the master processor 102 processes the clump list, converts the numbers of the sets within the clump list to elements (if necessary), and outputs the element clumps. In an exemplary embodiment, when all rows are marked as processed (PROCESSED), the master processor checks the clump list to ensure that there are no clumps in the clump list that are subsets of other clumps on the list. The master processor then converts the numbers of the sets within the clump list back to their original form by reversing the conversion introduced by the step of block 204. If the elements were in number form prior to conversion, the elements will be in number form after the conversion. In addition, if the elements were in number form and did not require conversion, the conversion process can be omitted. An exemplary clump list for descriptive purposes in both number form and output element form is set forth in TABLE 4.

TABLE 4

| Clumps (Number Representation) | Clumps (Output) |
| --- | --- |
| {1,2,3} | Red, Crimson Scarlet |
| {1,4,5} | Red, Blue, Yellow |
| {1,4,6} | Red, Blue, Green |
| {5,7} | Yellow, Golden |
| {7,8,9} | Golden, Silver, Bronze |
| {7,10,11} | Golden, Flaxen, Blonde |
| {12,13} | Violet, Purple |
| {14,15} | Black, Ebony |

Within TABLE 4, the first column depicts the clump list in number form and the second column depicts the clump list in element form for output.

Figure 3:
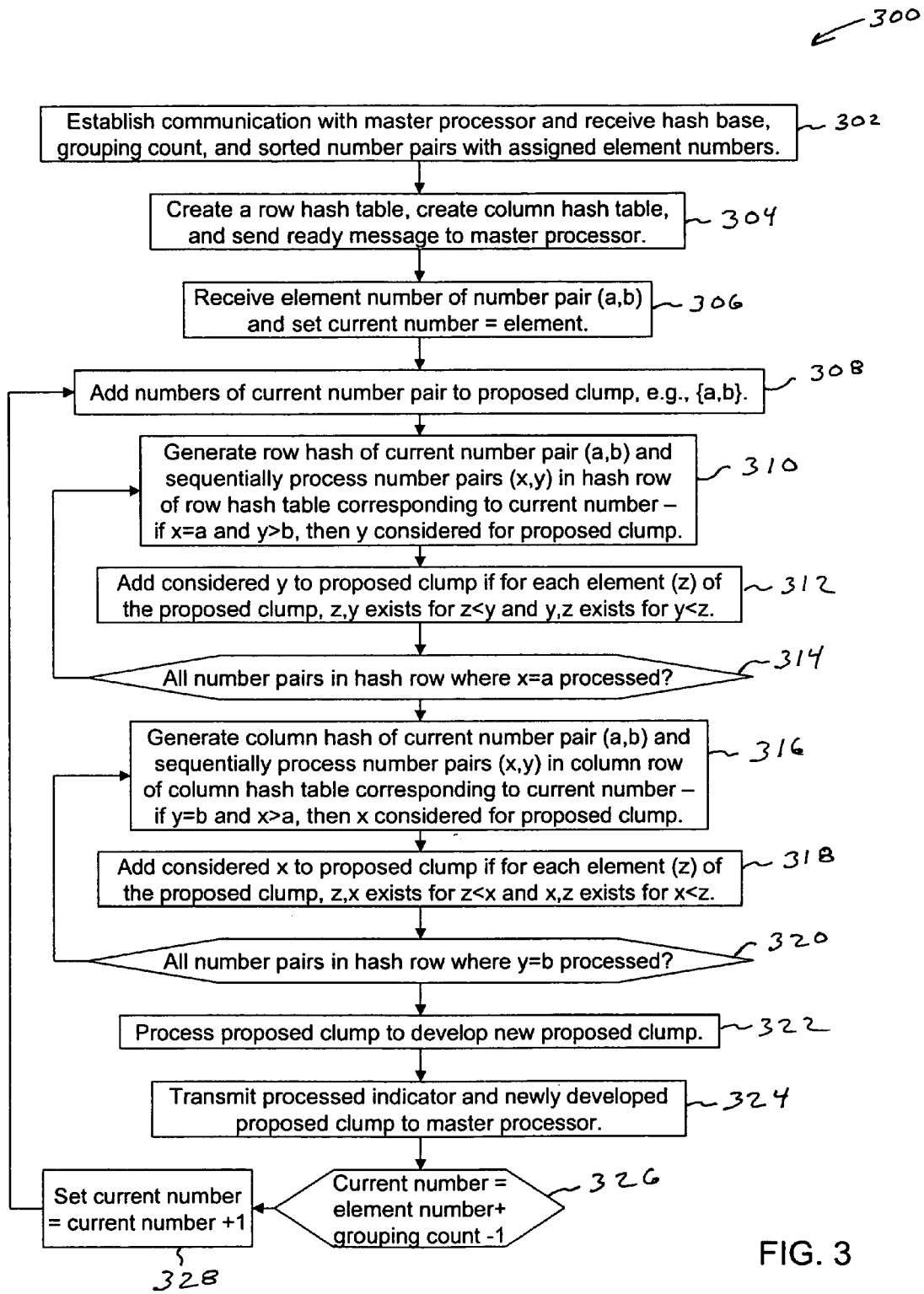
FIG. 3 is a flow chart of exemplary processing steps performed by an exemplary worker processor in accordance with the present invention.

FIG. 3 depicts a flow chart 300 of exemplary steps performed by a worker processor 104 in accordance with the present invention. Although the exemplary processing system 100 includes a plurality of worker processors 104, the operation of a single worker processor 104 is described to facilitate description. The other worker processors 104 within the processing system 100 operate in a similar manner. At block 302, the worker processor 104 established communication with the master processor 102 and receives a hash base, grouping count, and sorted numbers pairs with assigned reference numbers from the master processor 102. Communication may be established as described above with reference to block 208 of FIG. 2.

At block 304, the worker processor 104 creates a row hash table, creates a column hash table, and sends a ready message to the master processor 102. In an exemplary embodiment, the worker processor 104 creates the row hash table and the column hash table using the number pairs and hash base received from the master processor 102. The worker processor 104 may send a ready message to the master processor 102 indicating that it is ready to process a number pair after it has created the row hash table and the column hash table. In an alternative exemplary embodiment, the master processor 102 creates the row hash table and the column hash table and transmits them to the worker processor 104. In accordance with this embodiment, the worker processor 104 may send a ready message after receiving the row and column hash tables. Exemplary methods for creating the row hash table and the column hash table are described below with reference to FIGS. 4 and 5, respectively.

Figure 4:
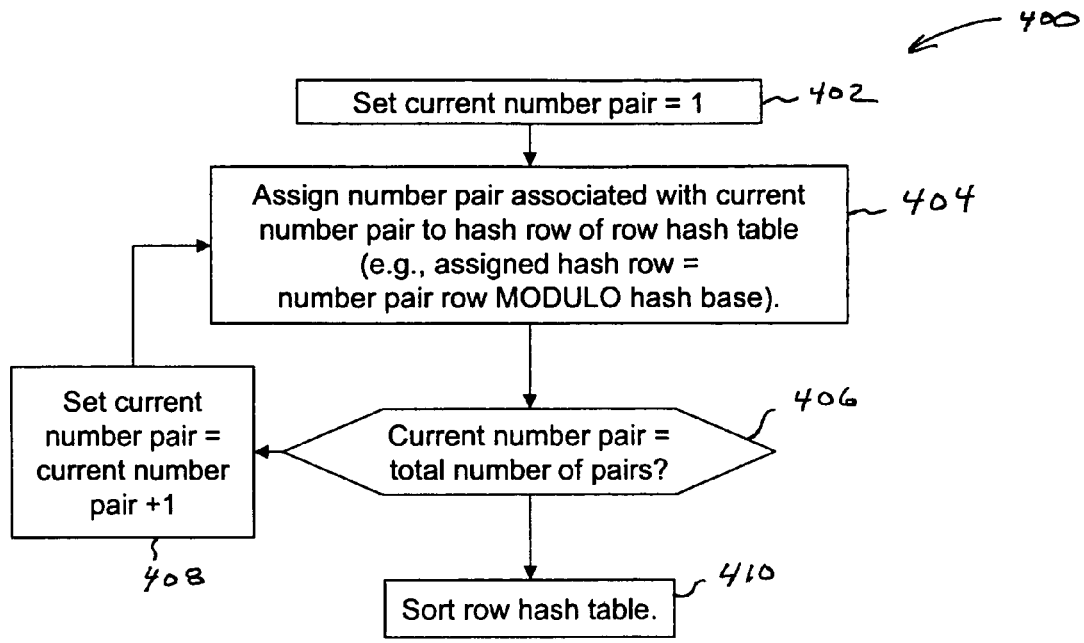
FIG. 4 is a flow chart of exemplary processing steps for generating a row hash table in accordance with the present invention.

FIG. 4 is a flow chart 400 of exemplary steps for creating a row hash table. At block 402, a current number pair variable is set equal to one. At block 404, a number pair associated with the current number pair variable is assigned to a hash row of the row hash table. In an exemplary embodiment, the number pair is assigned to the row hash table according to equation 1:

$$\text{assigned hash row} = \text{number pair row MODULO hash base} \qquad (1)$$

For example, the number pair (14,15) is assigned to hash row "3" of the row hash table (i.e., 14 MOD 11=3).

At block 406, a decision is made regarding whether the current number pair variable equals the quantity of number pairs. If the current number pair variable is not equal (e.g., is less than) the number pair quantity (indicating that all number pairs have not been processed), processing proceeds to block 408 where one is added to the current number pair variable and the step of block 404 is repeated. If the current number pair variable equals the number pair quantity (indicating that all number pairs have been processed), processing proceeds to block 410.

At block 410, the row hash table is sorted. In an exemplary embodiment, each row of the row hash table is sorted first by row number and then by column within common row numbers. An exemplary row hash table is depicted in TABLE 5 for descriptive purposes.

TABLE 5

| Row # | Number of elements | Number Pairs |
| --- | --- | --- |
| 0 | 0 | |
| 1 | 6 | (1,2)(1,3)(1,4)(1,5)(1,6)(12,13) |
| 2 | 1 | (2,3) |
| 3 | 1 | (14,15) |
| 4 | 2 | (4,5)(4,6) |
| 5 | 1 | (5,7) |
| 6 | 0 | |
| 7 | 4 | (7,8)(7,9)(7,10)(7,11) |

TABLE 5-continued

| Row # | Number of elements | Number Pairs |
| --- | --- | --- |
| 8 | 1 | (8,9) |
| 9 | 0 | |
| 10 | 1 | (10,11) |

Within TABLE 5, the first column depicts the hash row number for a hash base of eleven, the second column depicts the number of number pairs for each hash row of the row hash table, and the third column depicts the number pairs assigned to each hash row of the row hash table.

Figure 5:
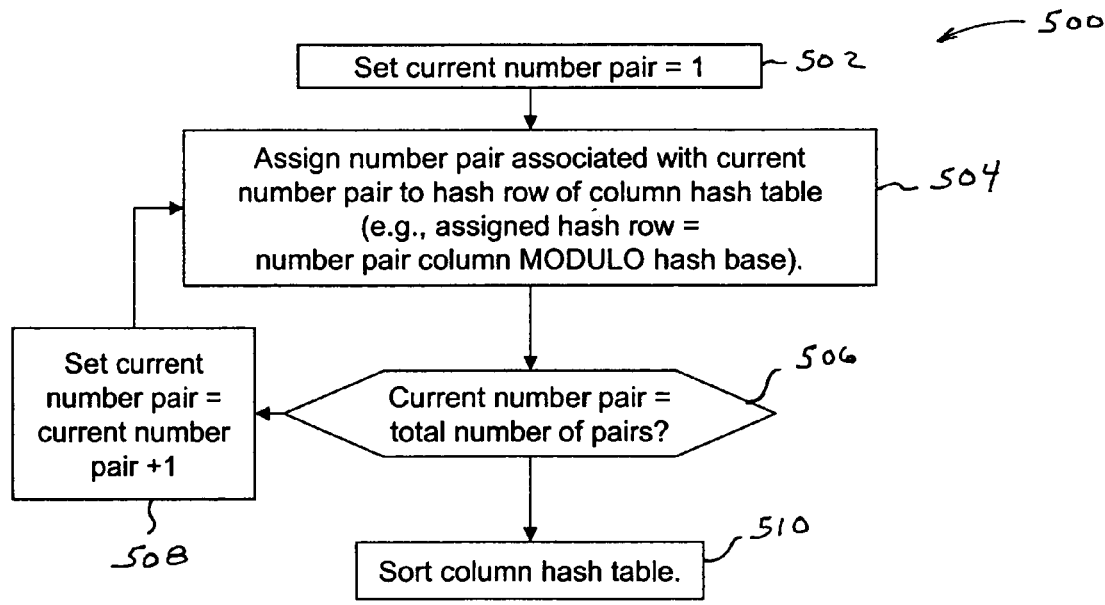
FIG. 5 is a flow chart of exemplary processing steps for generating a column hash table in accordance with the present invention.

FIG. 5 is a flow chart 500 of exemplary steps for creating a column hash table. At block 502, a current number pair variable is set equal to one. At block 504, a number pair associated with the current number pair variable is assigned to a hash row of the row column table. In an exemplary embodiment, the number pair is assigned to the column hash table according to equation 2:

$$\text{assigned hash row} = \text{number pair column MODULO hash base} \quad (2)$$

For example, the number pair (14,15) is assigned to hash row "4" of the column hash table (i.e., 15 MOD 11=4).

At block 506, a decision is made regarding whether the current number pair variable equals the quantity of number pairs. If the current number pair variable is not equal (e.g., is less than) the number pair quantity (indicating that all number pairs have not been processed), processing proceeds to block 508 where one is added to the current number pair variable and the step of block 504 is repeated. If the current number pair variable equals the number pair quantity (indicating that all number pairs have been processed), processing proceeds to block 510.

At block 510, the column hash table is sorted. In an exemplary embodiment, each row of the column hash table is sorted first by row number and then by column within common row numbers. An exemplary column hash table is depicted in TABLE 6 for descriptive purposes.

TABLE 6

| Column # | Number of elements | Number Pairs |
| --- | --- | --- |
| 0 | 2 | (7,11)(10,11) |
| 1 | 0 | |
| 2 | 2 | (1,2)(12,13) |
| 3 | 2 | (1,3)(2,3) |
| 4 | 2 | (1,4)(14,15) |
| 5 | 2 | (1,5)(4,5) |
| 6 | 2 | (1,6)(4,6) |
| 7 | 1 | (5,7) |
| 8 | 1 | (7,8) |
| 9 | 2 | (7,9)(8,9) |
| 10 | 1 | (7,10) |

Within TABLE 6, the first column depicts the hash row number for a hash base of eleven, the second column depicts the number of number pairs for each hash row of the column hash table, and the third column depicts the number pairs assigned to each hash row of the column hash table.

Referring back to FIG. 3, at block 306, the worker processor 104 receives a reference number for a number pair. In an exemplary embodiment, the worker processor 104 may also set a current number variable equal to the element number. The current number variable may be used by the worker processor to keep track of the number of elements it is processing so that an entire processing group of number pairs (e.g., in accordance with the grouping count) can be processed.

At block 308, the worker processor 104 adds the first and second numbers of the current number pair, e.g., (a,b), to a proposed clump, e.g., {a,b}.

At block 310, the worker processor 104 generates a row hash of the current number pair (a,b) and sequentially processes number pairs (x,y) in a hash row of the row hash table corresponding to the row hash of the current number pair, e.g., "a" MOD hash base. If the first number of a number pair in the hash row equals a first number in the current number pair (i.e., x=a) and the second number of that number pair in the hash row is greater than the second number of the current number pair (i.e., y>b), then the second number of that number pair (i.e., y) is considered for inclusion in the proposed clump.

At block 312, the number considered for inclusion in the proposed clump (i.e., y) is added to the proposed clump if each and every number in the proposed clump (where each number is individually represented by "z") combined with the number considered for inclusion (i.e., y) is one of the received number pairs, e.g., either (y,z) or (z,y). More specifically, the number considered for inclusion in the proposed clump (i.e., y) is added to the proposed clump if each element of the proposed clump (i.e., z) exists as a first number of a number pair within the received number pairs and the number considered for inclusion exists as a second number of those number pairs, i.e., (z,y), for elements that are less than the number considered for inclusion (i.e., z<y) and each element (z) of the proposed clump exists as a second number of a number pair within the received number pairs and the number considered for inclusion exists as a first number of those number pairs, i.e., (y,z), for elements that are greater than the number considered for inclusion (i.e., y<z).

At block 314, a decision is made regarding the number pairs in the hash row of the row hash table corresponding to the row hash of the current number pair. If all number pairs have been processed in the hash row where the first number of the number pair in the hash row equals the first number of the number pair being processed (i.e., x=a), processing proceeds to block 316. If all such number pairs have not been processed, processing proceeds at block 310 with the steps of block 310 and 312 repeated until all number pairs in the hash row have been processed where the first number of the number pair in the hash row equals the first number of the number pair being processed (i.e., x=a).

At block 316, the worker processor 104 generates a column hash of the current number pair (a,b) sequentially processes number pairs (x,y) in a hash row of the column hash table corresponding to the column hash of the current number pair, e.g., "b" MOD hash base. If the second number of a number pair in the hash row equals a second number in the current number pair (i.e., y=b) and the first number of that number pair in the hash row is greater than the first number of the current number pair (i.e., x>a), then the first number of that number pair (i.e., x) is considered for inclusion in the proposed clump.

At block 318, the number considered for inclusion in the proposed clump (i.e., x) is added to the proposed clump if each and every number in the proposed clump (where each number is individually represented by "z") combined with the number considered for inclusion (i.e., x) is one or the received number pairs, e.g., either (x,z) or (z,x). More specifically, the number considered for inclusion in the proposed clump (i.e., x) is added to the proposed clump if each element (z) of the proposed clump exists as a second number of a number pair within the received number pairs and the number considered for inclusion exists as a first number of those number pairs, i.e., (x,z), for elements that are less than the number considered for inclusion (i.e., z<x) and each element (z) of the proposed clump exists as a first number of a number pair within the received number pairs and the number considered for inclusion exists as a second number of those number pairs, i.e., (z,x), for elements that are greater than the number considered for inclusion (i.e., x<z).

At block 320, a decision is made regarding the number pairs in the hash row of the column hash table corresponding to the column hash of the current number pair. If all number pairs have been processed in the hash row where the second number of the number pair in the hash row equals the second number of the number pair being processed (i.e., y=b), processing proceeds to block 322. If all such number pairs have not been processed, processing proceeds at block 316 with the steps of block 316 and 318 repeated until all number pairs in the hash row have been processed where the second number of the number pair in the hash row equals the second number of the number pair being processed (i.e., y=b).

At block 322, the worker processor 104 processes the proposed clump to develop a new proposed clump. In an exemplary embodiment, the proposed clump is sorted and compared to other clumps previously found by the work processor 104. If the proposed clump is a subset of or equal to a previously found clump, the clump is discarded.

At block 324, the worker processor 104 transmits a processed indicator to the master processor 102 and also transmits a new proposed clump if developed. In an exemplary embodiment, the worker processor 104 transmits a processed indicator and/or a developed clump to the master processor after each number pair is processed. In an alternative exemplary embodiment, the worker processor 104 sends a processed indicator and/or developed clumps after all number pairs grouped in accordance with the grouping count are processed. Developed clumps may be stored in a memory (not shown) accessible by the worker processor 104 until all number pairs are processed.

At block 326, a decision is made regarding the number of elements that have been processed. If the current number variable equals the element number plus the grouping count minus one (indicating that all element pairs making up a grouping count of elements have been processed), processing ends. If the current number does not equal the element number plus the grouping count minus one (indicating that all elements pairs making up a grouping count of elements have not been processed), processing proceeds at block 308 with one being added to the current number variable and the steps of blocks 308 through 324 repeated until all element pairs making up a grouping count of elements have been processed.

The steps described above with reference to FIGS. 2-5 may be implemented in software by a computer (not shown). In this embodiment, one or more of the steps may be implemented in software that controls the computer. This software may be embodied in a computer readable carrier, for example, a magnetic or optical disk, a memory-card or an audio frequency, radio-frequency, or optical carrier wave.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for grouping elements of element pairs into element sets comprising the steps of:
   transmitting number pairs corresponding to the element pairs to a plurality of worker processors;
   selectively assigning processing of one or more of the number pairs within the transmitted number pairs to the plurality of worker processors responsive to ready to process indicators received from the plurality of worker processors, wherein each worker processor processes each number pair assigned for processing by that worker processor to develop a corresponding set of numbers from the transmitted number pairs;
   receiving the developed sets of numbers from the plurality of worker processors;
   processing the developed sets of numbers to generate the element sets; and
   outputting the generated element sets to a memory.

2. The method of claim 1, further comprising the steps of:
   selecting a hash base; and
   transmitting the hash base to the plurality of worker processors;
   wherein the plurality of worker processors process the transmitted number pairs using the hash base to create a row hash table and a column hash table for use in developing the sets of numbers.

3. The method of claim 1, further comprising the steps of:
   calculating a grouping count for assigning number pairs to the plurality of worker processors; and
   transmitting the grouping count to the plurality of worker processors, wherein the number pairs are assigned and processed in groups based on the grouping count.

4. The method of claim 1, further comprising the step of maintaining a status for each number pair, the status of each number pair indicating an unprocessed status, an in progress status, or a processed status and wherein the selectively assigning step comprises:
   selectively assigning, to one or more of the plurality of worker processors, processing of one or more number pairs within the transmitted number pairs having an unprocessed status; and
   selectively assigning, to one or more of the plurality of worker processors, processing of one or more number pairs within the transmitted number pairs having an in progress status if there are no number pairs with an unprocessed status.

5. The method of claim 1, further comprising the steps of:
   assigning numbers to the elements of the element pairs; and
   converting the elements within the element pairs with the assigned numbers to develop the number pairs.

6. The method of claim 1, wherein the numbers of the number pairs correspond to elements and wherein the method further comprise the steps of:
   sorting the developed sets of numbers;
   comparing the developed sets of numbers to identify duplicate sets and subsets;
   discarding duplicate sets and subsets; and
   converting the numbers within the sets of numbers that are not discarded with the corresponding element to develop the element sets.

7. The method of claim 1, wherein the assigning step is performed using threads such that multiple assignments for processing occur concurrently.

8. The method of claim 1, wherein one or more of the worker processors are located in remote processing systems connected by at least one of (i) a global information network or (ii) and intranet and wherein the method further comprises the step of:

establishing communication with the one or more worker processors located in the remote processing systems.

9. A method for developing sets of numbers from numbers within a plurality of number pairs, the method comprising the steps of:

receiving a plurality of number pairs from a master processor;

creating a row hash table and a column hash table from the plurality of number pairs;

sending a ready to process indicator to the master processor after creating the row hash table and the column hash table;

processing a number pair within the plurality of number pairs using the row hash table and the column hash table to develop a corresponding set of numbers; and storing the developed corresponding set of numbers to a memory.

10. The method of claim 9, further comprising the steps of:

receiving a hash base, for creating the row hash table and the column hash table from a master processor.

11. The method of claim 9, further comprising the step of:

receiving a reference number associated with the number pair from a master processor, wherein the processing step is performed responsive to receipt of the reference number.

12. The method of claim 11, further comprising the step of:

receiving a grouping count from the master processor, wherein the processing step is performed for the number pair associated with the received reference number and for additional number pairs based on the grouping count.

13. The method of claim 9, wherein the number pairs each include a first number and a second number and wherein the processing step comprises the steps of:

adding the first and second numbers of the number pair associated with the reference number pair to a proposed set;

processing number pairs in the row hash table having first numbers equal to the first number of the number pair associated with the reference number and adding the second number of the processed number pairs to the proposed set if each number in the proposed set combined with the second number is one of the number pairs; and processing number pairs in the column hash table having second numbers equal to the second number of the number pair associated with the reference number and adding the first number of the processed number pairs to the proposed set if each number in the proposed set combined with the first number is one of the number pairs.

14. The method of claim 9, wherein the number pairs each include a first number and a second number and wherein the step of creating the row hash table and the column hash table comprises the steps:

receiving a hash base from a master processor;

assigning each number pair to hash rows of the row hash table based on the first number of each number pair processed using the hash base; and assigning each number pair to hash rows of the column hash table based on the second number of each number pair processed using the hash base.

15. A system for grouping elements of element pairs into element sets, the system comprising:

a plurality of worker processors, each worker processor configured to send a ready to process indicator and to process a number pair within the plurality of number pairs using a row hash table and a column hash table created from the plurality of number pairs to develop a corresponding set of numbers; and a master processor configured to transmit the number pairs to the plurality of worker processors, receive the ready to process indicator from each worker processor, selectively assign processing of one or more of the number pairs within the transmitted number pairs to the plurality of worker processors responsive to receipt of the ready to process indicators, receive the developed sets of numbers from the plurality of worker processors, and process the developed sets of numbers to generate the element sets.

16. The system of claim 15, wherein the master processor is further configured to select a hash base and to transmit the hash base to the plurality of worker processors and wherein each of the plurality of worker processors are configured to create the row hash table and the column hash table based on the received hash base.

17. The system of claim 16, wherein each number pair includes a first number and a second number and wherein the worker processors create the row hash table by assigning each number pair to a row of the row hash table based on processing the first number of each number pair with the hash base and create the column hash table by assigning each number pair to a row of the column hash table based on processing the second number of each number pair with the hash base.

18. A tangible computer readable storage medium including software that is configured to control a computer to implement a method embodied in a computer readable medium for grouping elements of element pairs into element sets, the method including the steps of:

transmitting number pairs corresponding to the element pairs to a plurality of worker processors;

selectively assigning processing of one or more of the number pairs within the transmitted number pairs to the plurality of worker processors responsive to ready to process indicators received from the plurality of worker processors, wherein each worker processor processes each number pair assigned for processing by that worker processor to develop a corresponding set of numbers from the transmitted number pairs;

receiving the developed sets of numbers from the plurality of worker processors; processing the developed sets of numbers to generate the element sets; and outputting the generated element sets to a memory.

19. The tangible computer readable storage medium of claim 18, wherein the method implemented by the computer further includes the steps of:

calculating a grouping count for assigning number pairs to the plurality of worker processors; and transmitting the grouping count to the plurality of worker processors, wherein the number pairs are assigned and processed in groups based on the grouping count.

20. The tangible computer readable storage medium of claim 18, wherein the method implemented by the computer further includes the step of maintaining a status for each number pair, the status of each number pair indicating an unprocessed status, an in progress status, or a processed status and wherein the selectively assigning step for implementation by the computer comprises:

selectively assigning, to one or more of the plurality of worker processors, processing of one or more number pairs within the transmitted number pairs having an unprocessed status; and selectively assigning, to one or more of the plurality of worker processors, processing of one or more number pairs within the transmitted number pairs having an in progress status if there are no number pairs with an unprocessed status.

21. The tangible computer readable storage medium of claim 18, wherein the numbers of the number pairs correspond to elements and wherein the method implemented by the computer further includes the steps of:

sorting the developed sets of numbers;

comparing the developed sets of numbers to identify duplicate sets and subsets;

discarding duplicate sets and subsets; and converting the numbers within the sets of numbers that are not discarded with the corresponding element to develop the element sets.

22. A tangible computer readable storage medium including software that is configured to control a computer to implement a method embodied in a computer readable medium for developing sets of numbers from numbers within a plurality of number pairs, the method including the steps of:

receiving a plurality of number pairs;

creating a row hash table and a column hash table from the plurality of number pairs;

sending a ready to process indicator to the master processor after creating the row hash table and the column hash table;

processing a number pair within the plurality of number pairs using the row hash table and the column hash table to develop a corresponding set of numbers; and storing the developed corresponding set of numbers to a memory.

23. The tangible computer readable storage medium of claim 22, wherein the method implemented by the computer further includes the steps of:

receiving a hash base for creating the row hash table and the column hash table from a master processor.

24. The tangible computer readable storage medium of claim 22, wherein the number pairs each include a first number and a second number and wherein the processing step for implementation by the computer comprises the steps of:

adding the first and second numbers of the number pair associated with the reference number pair to a proposed set;

processing number pairs in the row hash table having first numbers equal to the first number of the number pair associated with the reference number and adding the second number of the processed number pairs to the proposed set if each number in the proposed set combined with the second number is one of the number pairs; and processing number pairs in the column hash table having second numbers equal to the second number of the number pair associated with the reference number and adding the first number of the processed number pairs to the proposed set if each number in the proposed set combined with the first number is one of the number pairs.

25. The tangible computer readable storage medium of claim 22, wherein the number pairs each include a first number and a second number and wherein the row hash table and column hash table creating step for implementation by the computer comprises the step of:

receiving a hash base from a master processor;

assigning each number pair to hash rows of the row hash table based on the first number of each number pair processed using the hash base; and assigning each number pair to hash rows of the column hash table based on the second number of each number pair processed using the hash base.

\* \* \* \* \*